Aug. 4, 1970     R. BERGERO     3,522,533
HIGH VOLTAGE TEST PROBE
Filed Nov. 15, 1966
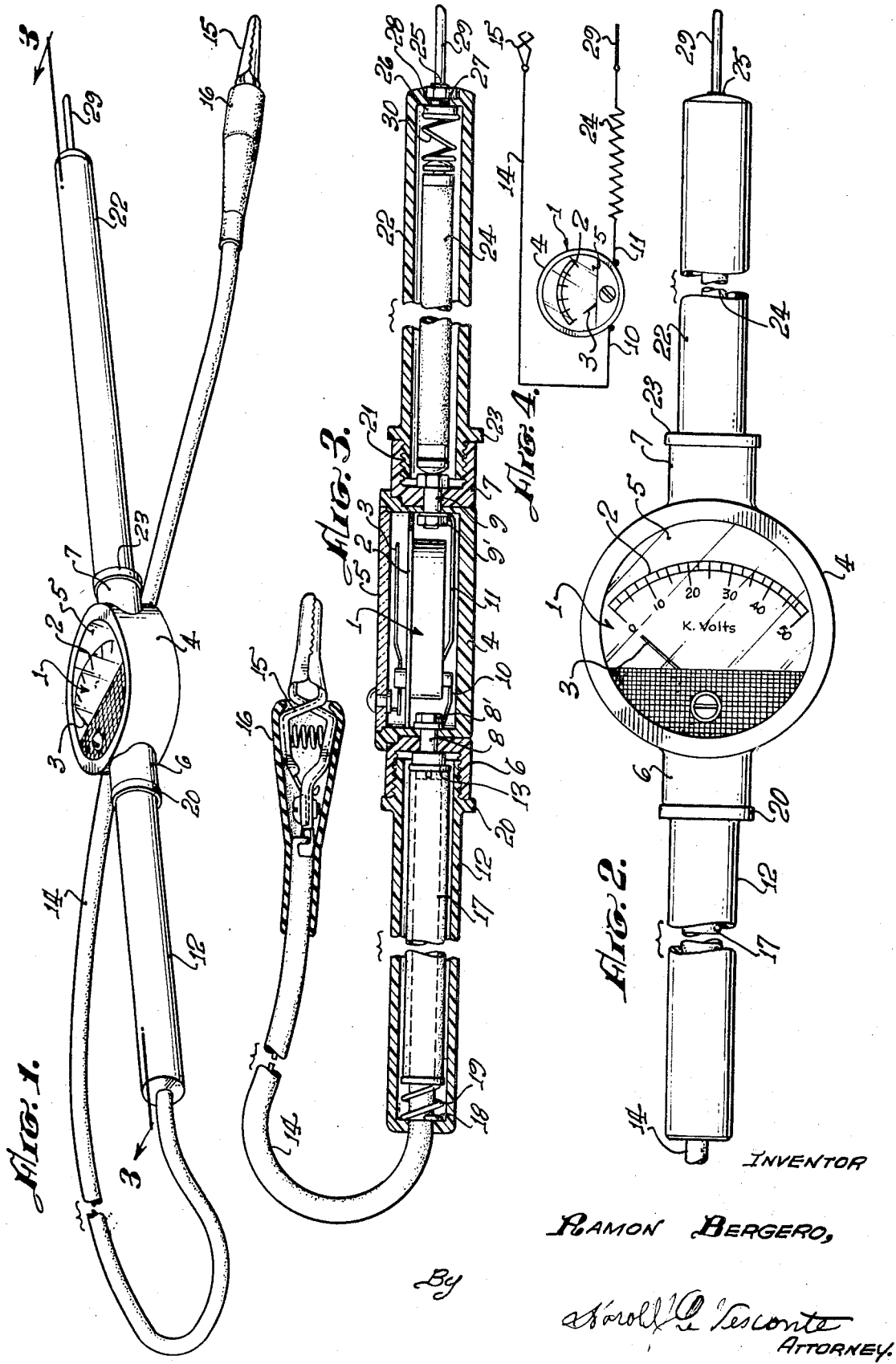
INVENTOR
RAMON BERGERO,
By
Harold L. Lesconte
ATTORNEY.

3,522,533
HIGH VOLTAGE TEST PROBE
Ramon Bergero, Los Angeles, Calif., assignor of one-half to Alva M. Henderson, Los Angeles, Calif.
Filed Nov. 15, 1966, Ser. No. 594,505
Int. Cl. G01r 1/06
U.S. Cl. 324—149                                  1 Claim

ABSTRACT OF THE DISCLOSURE

There is disclosed a hand-held apparatus for measuring high applied voltages in electrical circuits comprising a tube-like non-conductive case within which is mounted, in series electrical connection, a reduced diameter probe point, a resistor of predetermined value, a voltmeter, and a flexible electrical connector adapted at one end thereof for external attachment.

---

This invention relates to electrical measuring instruments and more particularly to a voltmeter for ascertaining the voltage applied to color television picture tubes. Improper voltage in color television sets may be the cause of such troubles as blooming, improper focus, changes in raster size as the brightness level of the picture changes, arcing inside the picture tube, dimming, etc. To prevent these troubles the high voltage must be kept constant at the values for which the set circuit is designed.

In servicing color television sets ascertaining the voltage applied to the tubes (usually about 25 kv.) is a difficult thing to be done except by bringing the set to a shop. Existing testing equipment for measuring these voltages is both bulky and costly and usually requires an extent of skill for proper use which is not possessed by the average television repair and service personnel and, in any event, the size and cost of such equipment is such that it is not carried about on service calls.

The present invention takes into account all of these factors and has for its principal objective the provision of a voltmeter means for ascertaining these extremely highly voltages which is characterized by being small enough to be carried in a repairman's tool box, which is of such simple design and susceptible of economical manufacture with attendant low cost as to be within the reach of all repairmen, and which does not require a skill above that of the average television serviceman to be used for the accurate determination of the voltage conditions for which it is intended to be used.

With the foregoing objectives in view together with such additional objectives and advantages as may subsequently appear the invention resides in the parts, and in the construction, combination and arrangement of parts described by way of example in the following specification of a presently preferred embodiment of the invention, reference being had to the accompanying drawings which form a part of said specification and in which drawings:

FIG. 1 is a perspective view of a voltmeter apparatus constituting a presently preferred embodiment of the invention, FIG. 2 is an enlarged scale plan view of the embodiment shown in FIG. 1 with the flexible conductor component thereof omitted to conserve space and with intermediate portions broken away also to conserve space, FIG. 3 is a medial longitudinal sectional view as taken on the line 3—3 of FIG. 1 with portions broken away to conserve space, and FIG. 4 is a circuit diagram of the apparatus.

Referring to the drawings, the illustrated embodiment of the invention includes a voltmeter 1 including a dial 2 having a scale reading from zero to 50 kv. traversed by a needle 3. This voltmeter is mounted within a circular, non-conductive case 4 having a transparent cover 5 superimposed on the dial 2 and through which the indicated voltage of an imposed current may be read. The case 4 is provided at diametrically opposite points with internally threaded bushings 6 and 7 of non-conductive material, said bushings being secured to the case by bolts 8 and 9 with associated nuts 8' and 9' disposed at the inner wall surface of the case 4. A lead 10 having one end connected to one terminal of the voltmeter has the opposite end thereof secured to the bolt 8 by the nut 8' and a second lead 11 having one end thereof connected to the other terminal of the voltmeter has its opposite end secured to the bolt 9 by the nut 9'.

One end of a rigid sleeve 12 formed of non-conductive material threadedly engages the bushing 6 and said sleeve serves as a handle for the instrument and as a housing for the contact end 13 of a flexible conductor 14 which extends through and beyond the other end of the sleeve and terminates in a manually operable spring jaw contact clamp means 15 having the manually contacted portion thereof insulated by being housed in a flexible rubber cover 16. Within the sleeve 12, the conductor extends through a rigid tubular non-conductive inner sleeve 17 and is electrically connected to a screw means including a head which constitutes the contact end 13 at the inner end of the conductor. The outer end of the sleeve 12 is reduced in diameter to closely fit the conductor 14 with resultant formation of a shoulder 18 and a compression spring 19 surrounding the conductor 14 is interposed between the shoulder 18 and the adjacent end of the inner sleeve 17, the lengths of the sleeves 12 and 17 and of the spring 19 being such that when the sleeve 12 is screwed into the bushing 6 to the extent permitted by the engagement of the flange 20 of the sleeve 12 with the end of the bushing, the spring 19 will be compressed with resultant maintenance of electrically conductive engagement of the contact screw 13 with the head 8" of the bolt 8.

The bushing 7 is threadedly engaged with the threaded end 21 of an elongated tubular sleeve 22 formed of rigid non-conductive material and having an annular flange portion 23 engageable with the end of the bushing 7, said sleeve having an internal diameter and length sufficient to house a 1,000 megohm resistor 24. At its other end, the sleeve carries a probe point means projecting axially beyond said other end and comprising a screw 25 having a head 26 disposed within the sleeve and secured therein by a nut 27 housed in a counterbore 28 in the outer end of the sleeve, said screw including an elongated, reduced diameter probe point component 29 projecting beyond the end of the sleeve. The resistor 24 is contained within the sleeve 22 and a compression spring 30 is interposed between the probe point screw head 26 and the adjacent end of the resistor 24 operates both to yieldingly maintain the opposite end of the resistor in contact with the head 9" of the bolt 9 and as a conductor between the screw head 26 and the adjacent end of the resistor. Alternatively, of course, the spring may be interposed between the bolt head 9" and the adjacent end of the resistor to similarly maintain electrically conductive contact between the head 26 of the screw 25 and the adjacent end of the resistor and also to serve as the electrically conductive connecting means between the head 9" of the bolt 9 and the adjacent end of the resistor 24.

It should be noted that not only does the spring 30 thus perform two separate functions simultaneously but that the bolts 8 and 9 also serve two functions in that, first, they serve to hold the bushings 6 and 7 in assembly with the case and, second, they serve as the connecting and conductive means extending through the wall of the case 4 between the voltmeter and its leads and the resistor and probe point 29 at one end and the flexible lead and spring jaw connector 15 at the other end thereof.

The use and operation of the device is believed to be obvious to those skilled in the art to which the invention appertains. When a circuit is to be checked, the spring jaw connector 15 is connected to ground and the probe point 29 is brought into contact with the various portions of the circuit which is subject to investigation. If the reading on the voltmeter dial is not what it should be dependent upon the nature and portion of the set being checked and the portion of the set circuit involved, the cause of the trouble can be located and rectified.

By reason of the use of a 1,000 megohm resistor, the user does not have to ascertain which scale on a multiple scale voltmeter instrument should be employed and can ascertain the reading directly from the dial. If desired, the dial can be provided with special graduations to indicate the voltages most commonly employed, viz, 5 kv. and 25 kv., either by making the lines indicating those voltages of a different color or making them heavier than the other calibration lines.

Thus there has been provided an instrument which can be readily carried in a serviceman's tool box, which can be readily employed in checking a set incident to a service call, which is simple in construction and consequently capable of manufacture and sale at a price within the reach of the average television repairman, and which is effective for its intended purpose.

While in the foregoing specification a presently preferred embodiment of the invention has been disclosed, it is not to be inferred therefrom that the invention is limited to the specific details of construction thus disclosed by way of example and it will be understood that the invention includes as well all such changes and modifications in the parts and in the construction, combination and arrangement of parts as shall come within the purview of the appended claim.

I claim:

1. A unitary electrical circuit testing instrument comprising:
   (a) a voltmeter having a pair of terminals;
   (b) a rigid non-conductive case enclosing said voltmeter, including a first internally threaded bushing affixed to said case by a first conductive means electrically connected to one of said pair of terminals, and a second internally threaded bushing affixed to said case by a second conductive means electrically connected to the other of said pair of terminals, said first bushing and second bushing being disposed at diametrically opposite points in said case;
   (c) a first rigid tubular member projecting from said case having one end thereof threadedly engaged within said first bushing for detachment therefrom, said first tubular member defining an interior flange at its distal end;
   (d) a flexible conductor extending through and beyond the distal end of said first tubular member having a contact end internally disposed adjacent said first conductive means and an end disposed externally of said first tubular member provided with means for effecting conductive engagement;
   (e) a rigid non-conductive tubular sleeve surrounding said flexible conductor within said first tubular member, one end of said sleeve abutting said contact end of said flexible conductor;
   (f) spring means disposed under compression within said first tubular member between said interior flange and the adjacent end of said sleeve, whereby said contact end of said flexible connector is maintained in abutment with said first conductive means;
   (g) a second non-conductive rigid tubular member projecting from said case opposite said first tubular member having one end thereof threadedly engaged within said second bushing for detachment therefrom;
   (h) an electrically conductive probe point disposed at the distal end of said second tubular member;
   (i) an electrical resistance of predetermined value disposed within said second tubular member having an end thereof adjacent said second conductive means; and,
   (j) electrically conductive compression spring means conductively interposed between said probe point and said resistance whereby said resistance is maintained in electrically connective abutment with said second conductive means and in electrical contact with said voltmeter.

References Cited

UNITED STATES PATENTS 2,552,981    5/1951    Lamb _____ 324—149 X
2,857,572    10/1958    Belart.

FOREIGN PATENTS 495,485    11/1938    England.
1,157,697    11/1963    Germany.

ALFRED E. SMITH, Primary Examiner

U.S. Cl. X.R.

324—72.5